US008270052B2

(12) United States Patent
Iwata

(10) Patent No.: US 8,270,052 B2
(45) Date of Patent: Sep. 18, 2012

(54) OPTICAL SCANNER

(75) Inventor: Naoyuki Iwata, Kakamigahara (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 259 days.

(21) Appl. No.: 12/841,274

(22) Filed: Jul. 22, 2010

(65) Prior Publication Data

US 2011/0019254 A1 Jan. 27, 2011

(30) Foreign Application Priority Data

Jul. 24, 2009 (JP) ................. 2009-172955

(51) Int. Cl.
G02B 26/08 (2006.01)
(52) U.S. Cl. .................. 359/204.1
(58) Field of Classification Search ............. 359/196.1, 359/204.1, 216.1; 347/241–245
See application file for complete search history.

(56) References Cited

U.S. PATENT DOCUMENTS

| 7,760,228 B2 * | 7/2010 | Mamiya ................ 347/242 |
| 7,782,352 B2 | 8/2010 | Ohsugi |
| 2006/0187513 A1 | 8/2006 | Ohsugi |
| 2007/0165097 A1 | 7/2007 | Kato et al. |
| 2010/0265310 A1 | 10/2010 | Ohsugi |

FOREIGN PATENT DOCUMENTS

| JP | 11-183827 | 7/1999 |
| JP | 2000-258712 A | 9/2000 |
| JP | 2000-292730 | 10/2000 |
| JP | 2005-305964 A | 11/2005 |
| JP | 2006-234977 A | 9/2006 |
| JP | 2007-178605 | 7/2007 |

OTHER PUBLICATIONS

JP Office Action dtd Apr. 26, 2011, JP Appln. 2009-172955, English Translation.
CN Office Action dated Sep. 14, 2011, corresponding Application No. 201010240833.7; English Translation.
JP Office Action dtd Mar. 6, 2012, JP Appln. 2009-172955, English Translation.

* cited by examiner

Primary Examiner — Euncha Cherry
(74) Attorney, Agent, or Firm — Banner & Witcoff, Ltd.

(57) ABSTRACT

An optical scanner scans target surfaces with laser beams emitted from first and second light sources and deflected by a light deflector. The optical scanner includes a first frame on which the first and second light sources, and the light deflector are mounted. The first frame has first and second exposure openings each extending in a main scanning direction and configured to allow a laser beam to pass therethrough from an interior of the optical scanner toward a corresponding target surface outside the optical scanner. The light deflector is attached to the first frame in a surrounding area defined by the first and second exposure openings. A second frame is provided opposite to the first frame on a side of the first frame where the light deflector is positioned, and at least one connecting member for connecting the first and second frames is provided in the surrounding area.

16 Claims, 13 Drawing Sheets

OPTICAL SCANNER

CROSS-REFERENCE TO RELATED APPLICATION(S)

This application claims priority from Japanese Patent Application No. 2009-172955 filed on Jul. 24, 2009, the disclosure of which is incorporated herein by reference in its entirety.

BACKGROUND OF THE INVENTION

1. Field of the Invention

The present invention relates to an optical scanner configured to scan target surfaces with laser beams emitted from a plurality of light sources and deflected by a light deflector.

2. Description of Related Art

In a tandem-type image forming apparatus in which a plurality of photoconductor drums are arranged in tandem, an optical scanner is provided for exposing photoconductor drums with light. The optical scanner is configured to scan surfaces of the photoconductor drums with laser beams that are emitted from a plurality of light sources and deflected by a light deflector such as a polygon mirror.

One example of such an optical scanner, known in the art, includes a plurality of laser light sources, a light deflector configured to reflect laser beams emitted from the laser light sources so as to deflect the laser beams in the main scanning direction, a plurality of laser light outlets (exposure openings) extending in the main scanning direction and allowing the corresponding laser beams to pass therethrough from an interior of the optical scanner toward target surfaces outside the optical scanner, a frame attached in the optical scanner in an area extending between two exposure openings, and a light deflector attached to the frame.

In recent years, in order to enhance the speed of equipment with an optical scanner, such as the printing speed of an image forming apparatus, there have been increasingly employed light deflectors capable of operating at high speeds for scanning with laser beams. However, according to the above-type optical scanner in which a light deflector is attached to a frame in an area between two exposure openings, a resonance may occur at the area of the frame between the two exposure openings due to high-speed operation of the light deflector.

Once such a resonance occurs, the light deflector vibrates. This may disadvantageously cause the optical axes of the laser beams reflected by the light deflector to be out-of-alignment and thus undergo a change in the exposure angle. For this reason, the image forming apparatus equipped with this optical scanner may not correctly expose the surfaces of the photoconductor drums, and as a result, an image may be formed on a sheet with unevenly developed colors.

In view of the above disadvantages, it would be desirable to provide an optical scanner of the type where a light deflector is attached to a frame in an area between two exposure openings, which optical scanner can restrict a resonance during the operation of the light deflector.

SUMMARY OF THE INVENTION

In accordance with one aspect of the present invention, as embodied and described herein, there is provided an optical scanner for scanning target surfaces with laser beams. The optical scanner comprises: first and second light sources each configured to emit a laser beam; a light deflector configured to reflect the laser beams from the first and second light sources so as to deflect the laser beams in a main scanning direction for scanning the target surfaces; and a first frame on which the first light source, the second light source, and the light deflector are mounted. The first frame has a first exposure opening and a second exposure opening, the first exposure opening extending in the main scanning direction and configured to allow the laser beam emitted from the first light source to pass therethrough from an interior of the optical scanner toward a corresponding target surface outside the optical scanner, whereas the second exposure opening extending in the main scanning direction and configured to allow the laser beam emitted from the second light source to pass therethrough from the interior of the optical scanner toward a corresponding target surface outside the optical scanner. The light deflector is attached to the first frame in a surrounding area defined by the first exposure opening, the second exposure opening, a line segment connecting one end of the first exposure opening and one end of the second exposure opening, and a line segment connecting the other end of the first exposure opening and the other end of the second exposure opening. Further, a second frame is provided opposite to the first frame on a side of the first frame where the light deflector is positioned, and at least one connecting member configured to connect the first frame and the second frame is provided in the surrounding area.

BRIEF DESCRIPTION OF THE DRAWINGS

To better understand the claimed invention, and to show how the same may be carried into effect, reference will now be made, by way of example only, to the accompanying drawings, in which:

FIGS. 12A to 12C are explanatory views of a connecting boss, in which FIG. 12A is a fragmentary sectional view of the connecting boss, FIG. 12B is a sectional view taken along the line B-B of FIG. 12A, and FIG. 12C is a sectional view taken along the line C-C of FIG. 12A.

DETAILED DESCRIPTION OF THE EXEMPLARY EMBODIMENTS

<First Embodiment>

With reference to the accompanying drawings, a first embodiment of the present invention will be described. In the following description, an overall configuration of a color printer (image forming apparatus) 1 equipped with an optical scanner 40 will be schematically described at first, and then, the configuration of the optical scanner 40 will be described in detail.

Overall Configuration of Color Printer

Figure 1:
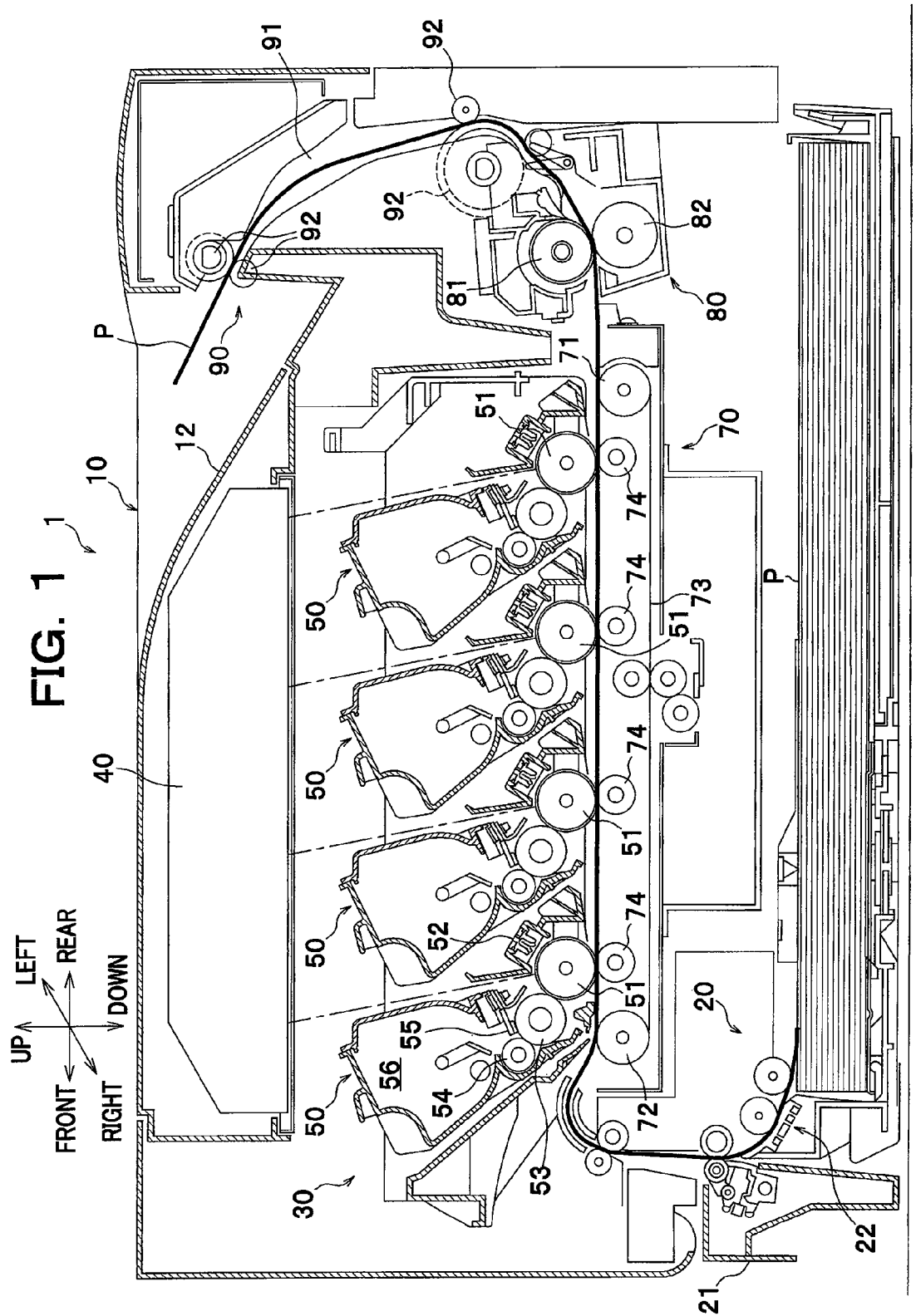
FIG. 1 is a sectional view showing an overall configuration of an image forming apparatus equipped with an optical scanner according to one or more aspects of the present invention.

As seen in FIG. 1, a color printer 1 has a main body casing 10. In the main body casing 10, the color printer 1 includes a sheet feeding unit 20 configured to feed a sheet of paper P (hereinafter simply referred to as a "sheet" P), an image forming unit 30 configured to form an image on the sheet P supplied from the sheet feeding unit 20, and a sheet output unit 90 configured to discharge the sheet P having the image thereon from the main body casing 10.

In the following description, directions are defined based on a user facing to the color printer 1 during its use. To be more specific, referring to FIG. 1, the left-hand side of the drawing sheet corresponds to the "front" side, the right-hand side of the drawing sheet corresponds to the "rear" side, the front side of the drawing sheet toward a viewer of the figure corresponds to the "right" side, and the back-side of the drawing sheet away from the viewer corresponds to the "left" side. Also, the upward and downward direction of the drawing sheet corresponds to the "vertical" direction or the "up/down (upper/lower or top/bottom)" direction.

The sheet feeding unit 20 is arranged in the main body casing 10 at a lower part thereof, and mainly includes a sheet feed tray 21 configured to store a stack of sheets P, and a sheet feed mechanism 22 configured to convey a sheet P from the sheet feed tray 21 to the image forming unit 30. In the sheet feeding unit 20, the sheet feed mechanism 22 separates the stack of sheets P stored in the sheet feed tray 21 and feeds a sheet P on one-by-one basis to the image forming unit 30.

The image forming unit 30 mainly includes an optical scanner 40, four process units 50, a transfer unit 70, and a fixing device 80.

The optical scanner 40 is arranged in the main body casing 10 at an upper part thereof, and configured to scan and expose a surface (i.e., one example of a target surface) of each photoconductor drum 51 with a laser beam (see chain lines) based on image data, so that an electrostatic latent image is formed on the surface of each photoconductor drum 51. Detailed configuration of the optical scanner 40 will be described later.

The process units 50 are arranged in tandem along the front and rear direction between the sheet feeding unit 20 and the optical scanner 40. Each process unit 50 mainly includes a photoconductor drum 51, a charger 52, a development roller 53, a supply roller 54, a doctor blade 55, and a toner storage reservoir 56. Black toner, yellow toner, magenta toner, and cyan toner are stored in the toner storage reservoirs 56 of the corresponding process units 50.

The transfer unit 70 is arranged between the sheet feeding unit 20 and the process unit 50, and mainly includes a drive roller 71, a driven roller 72, an endless conveyor belt 73 looped between the drive roller 71 and the driven roller 72, and four transfer rollers 74. The conveyor belt 73 has an outer surface which is in contact with the photoconductor drums 51, and the transfer rollers 74 are disposed inside the looped conveyor belt 73 at positions corresponding to the photoconductor drums 51, so that the conveyor belt 73 is held between the photoconductor drums 51 and the transfer rollers 74.

The fixing device 80 is arranged at the rear of the process unit 50 and the transfer unit 70. The fixing device 80 mainly includes a heating roller 81, and a pressure roller 82 positioned opposite to the heating roller 81 and pressed against the heating roller 81.

According to the image forming unit 30 configured as described above, the surface of each photoconductor drum 51 is uniformly charged by the corresponding charger 52, and then exposed to a laser beam that is emitted from the optical scanner 40 and scans the surface at high speeds, so that an electrostatic latent image is formed on the surface of the photoconductor drum 51. Meanwhile, toner stored in the toner storage reservoir 56 is supplied via the supply roller 54 to the development roller 53, and advances between the development roller 53 and the doctor blade 55, so that a thin layer of toner having a constant thickness is carried on the development roller 53.

The toner carried on the development roller 53 is supplied from the development roller 53 to the electrostatic latent image formed on the photoconductor drum 51. Therefore, the electrostatic latent image is visualized and a toner image is formed on the photoconductor drum 51. Thereafter, while a sheet P supplied onto the conveyor belt 73 is conveyed along the conveyor belt 73 between the photoconductor drums 51 and the transfer rollers 74, the toner images formed on the respective photoconductor drums 51 are transferred one after another onto the sheet P. When the sheet P passes through between the heating roller 81 and the pressure roller 82, the toner image on the sheet P is thermally fixed.

The sheet output unit 90 mainly includes a sheet output path 91 extending upward from an outlet of the fixing device 80 and changing its direction to extend forward, and a plurality of conveyor rollers 92 configured to convey the sheet P. The sheet P on which the toner image has been thermally fixed is conveyed by the conveyor rollers 92 along the sheet output path 91, and ejected onto a sheet output tray 12.

Detailed Configuration of Optical Scanner

The configuration of the optical scanner 40 will be described in detail. In the following description, a "main scanning direction" is referred to as a direction along which the surface of the photoconductor drum 51 is scanned with the laser beam. According to this embodiment, the main scanning direction corresponds to the right-left direction. On the contrary, a sub-scanning direction is a direction orthogonal to the main scanning direction (also orthogonal to an optical axis of the laser beam).

Figure 2:
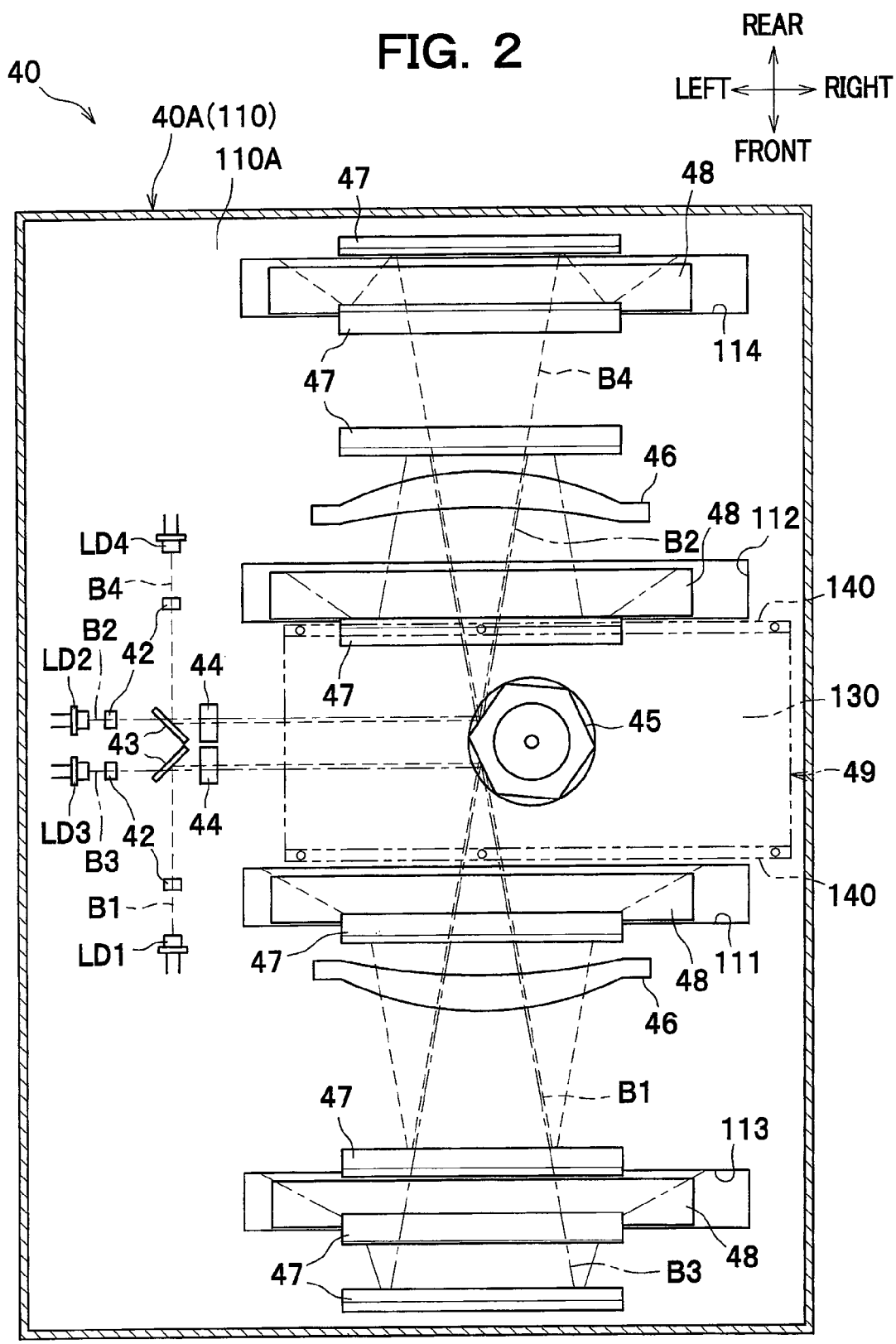
FIG. 2 is a plan view of an optical scanner according to a first embodiment of the present invention.
Figure 3:
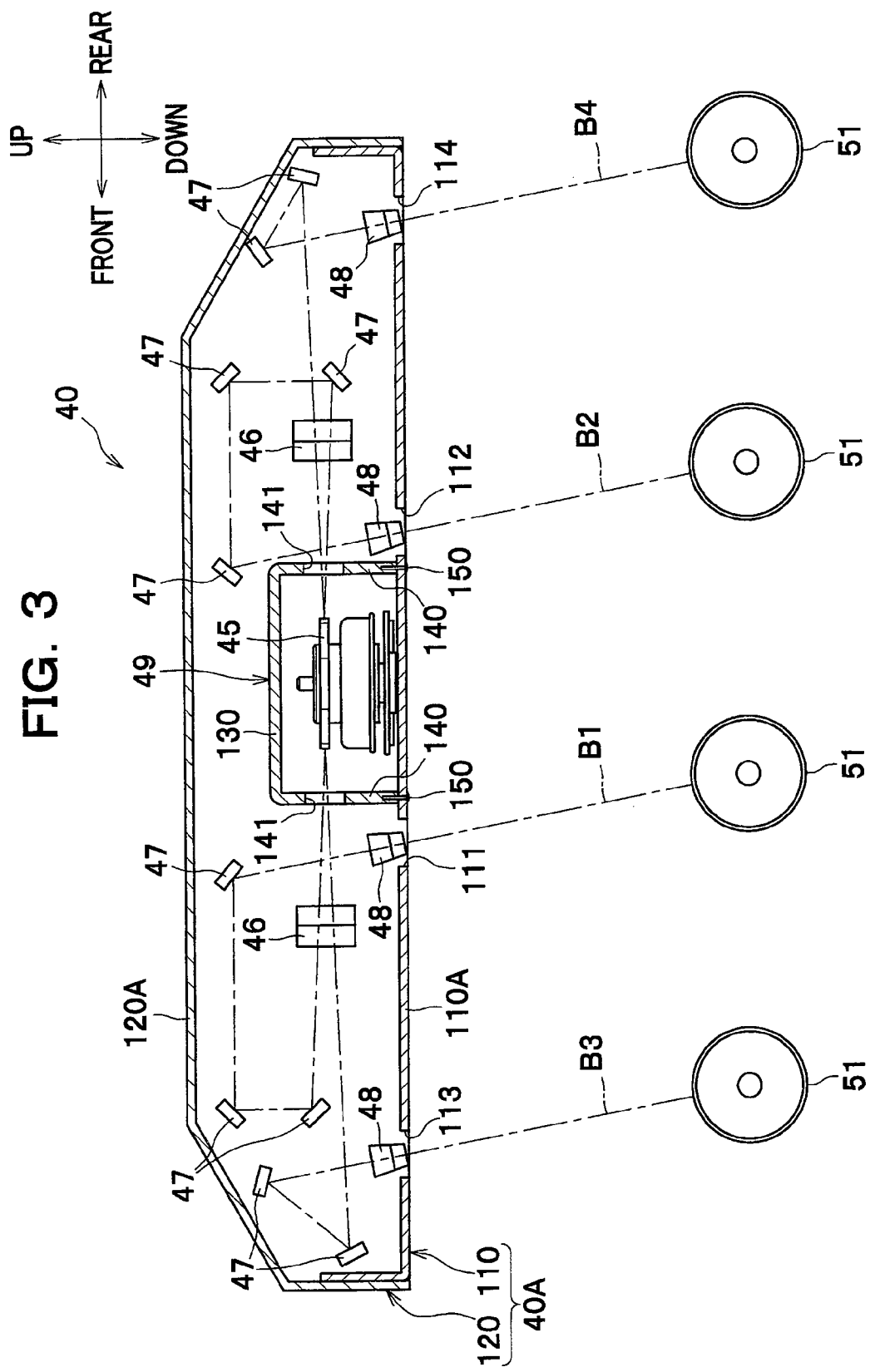
FIG. 3 is a side sectional view of the optical scanner according to the first embodiment.

As seen in FIGS. 2 and 3, the optical scanner 40 mainly includes four semiconductor lasers LD1-LD4 as an example of first to fourth light sources, collimating lenses 42, reflecting mirrors 43, cylindrical lenses 44, a polygon mirror as an example of a light deflector, fθ lenses 46, reflecting mirrors 47, correcting lenses 48, and a reinforcement member 49, in a casing 40A of the optical scanner 40.

The semiconductor laser LD1-LD4 is a known element configured to emit a laser beam. In this embodiment, four semiconductor lasers LD1-LD4 are provided in accordance with the four photoconductor drums 51 to be exposed to laser beams by the optical scanner 40. Of these semiconductor lasers, the semiconductor laser LD2 (second light source) and the semiconductor laser LD3 (third light source) are adjacent to each other, facing to the polygon mirror 45 in the right-left direction. The semiconductor laser LD1 (first light source) and the semiconductor laser LD4 (fourth light source) are arranged opposite to each other in the front-rear direction such that optical axes of laser beams (B1, B4) emitted from the semiconductor lasers LD1, LD4 are substantially orthogonal to optical axes of laser beams (B2, B3) emitted from the semiconductor lasers LD2, LD3.

The collimating lens 42 is a lens configured to condense a laser beam emitted from the semiconductor laser LD1-LD4 to convert it into a parallel beam of light. In this embodiment, one collimating lens 42 each is provided at a downstream from the semiconductor laser LD1-LD4 in a laser beam traveling direction from the corresponding semiconductor laser LD1-LD4.

The reflecting mirror 43 is a mirror configured to reflect an incoming laser beam from the semiconductor laser LD1 or the semiconductor laser LD4 toward the polygon mirror 45. One reflecting mirror each is provided between the semiconductor laser LD2, LD3 (collimating lens 42) and the polygon mirror 45, which are positioned in the right-left direction. Laser beams emitted from the semiconductor lasers LD2 and LD3 pass over the reflecting mirrors 43 and directly go into the polygon mirror 45.

The cylindrical lens 44 refracts a laser beam for correcting an optical face tangle error of the polygon mirror 45. The laser beams emitted from the semiconductor lasers LD1-LD4 are refracted and converged by the cylindrical lenses 44 in the sub-scanning direction, and then focused on the rotating polygon mirror 45. Two cylindrical lenses 44 are provided in this embodiment, each positioned between the semiconductor laser LD2, LD3 (each of the reflecting mirrors 43) and the polygon mirror 45.

The polygon mirror 45 is in the shape of a hexagonal cylinder having six reflecting mirrors on its side surfaces, and is configured to rotate at high speeds during which the laser beams emitted from the semiconductor lasers LD1-LD4 are reflected by the reflecting mirrors, thereby deflecting and scanning at a constant angular velocity the laser beams in the main scanning direction. As explained later in detail, the polygon mirror 45 is arranged substantially at or in the vicinity of a center portion of the casing 40A (i.e., on a bottom wall portion 110A of a receiving frame 110).

The fθ lens 46 is a lens configured to convert a laser beam having scanned by the polygon mirror 45 at a constant angular velocity, into the beam of constant speed scanning in the main scanning direction. Two fθ lenses 46 are provided in this embodiment, each positioned at the front and the rear of the polygon mirror 45.

The reflecting mirror 47 is a mirror for reflecting a laser beam. The reflecting mirrors 47 are arranged at appropriate positions so that the laser beams having passed through the fθ lenses 46 are directed to the correcting lenses 48.

The correcting lens 48 refracts a laser beam for correcting an optical face tangle error of the polygon mirror 45. The laser beams are refracted and converged by the correcting lenses 48 in the sub-scanning direction, and thus focused on the photoconductor drums 51. Four correcting lenses 48 are provided in this embodiment, each positioned near four exposure openings 111-114 to be described later.

The laser beam emitted from each of the semiconductor lasers LD1-LD4 first passes through the collimating lens 42 and the cylindrical lens 44, and is then deflected and scanned in the main scanning direction when reflected by the polygon mirror 45. It is to be noted that the laser beams from the semiconductor lasers LD1, LD4 first pass through the collimating lens 42, and are then reflected by the reflecting mirror 43 toward the cylindrical lens 44. Thereafter, each of the laser beams passes through the fθ lens 46, and travels along a plurality of reflecting mirrors 47 toward the correcting lens 48 while being reflected by the reflecting mirrors 47. The surface of each photoconductor drum 51 is scanned and exposed with the laser beam having passed through the correcting lens 48.

As seen in FIG. 3, the casing 40A mainly comprises a receiving frame 110 as an example of a first frame, and a lid frame 120 as an example of a third frame.

The receiving frame 110 is made of resin and is substantially of an open box shape having an opening at its top. Parts such as the semiconductor lasers LD1-LD4 (see FIG. 2) and the polygon mirror 45 are mounted in the receiving frame 110 (i.e., on the upper surface of the bottom wall portion 110A).

As best seen in FIG. 2, the receiving frame 110 (i.e., bottom wall portion 110A) has four rectangular-shaped exposure openings 111-114. Each exposure opening 111-114 extends in the main scanning direction (i.e., right-left direction), and allows the corresponding laser beam to pass therethrough from an interior of the optical scanner 40 toward the surface (target surface) of the corresponding photoconductor drum 51 outside the optical scanner 40.

A first exposure opening 111 through which the laser beam (B1) from the semiconductor laser LD1 is allowed to pass and a second exposure opening 112 through which the laser beam (B2) from the semiconductor laser LD2 is allowed to pass are adjoining each other and arranged in the front-rear direction. Further, a third exposure opening 113 through which the laser beam (B3) from the semiconductor laser LD3 is allowed to pass and a fourth exposure opening 114 through which the laser beam (B4) from the semiconductor laser LD4 is allowed to pass are arranged to interpose the first exposure opening 111 and the second exposure opening 112 in the front-rear direction. The third exposure opening 113, the first exposure opening 111, the second exposure opening 112, and the fourth exposure opening 114 are arranged in this order from the front side of the receiving frame 110.

Figure 4:
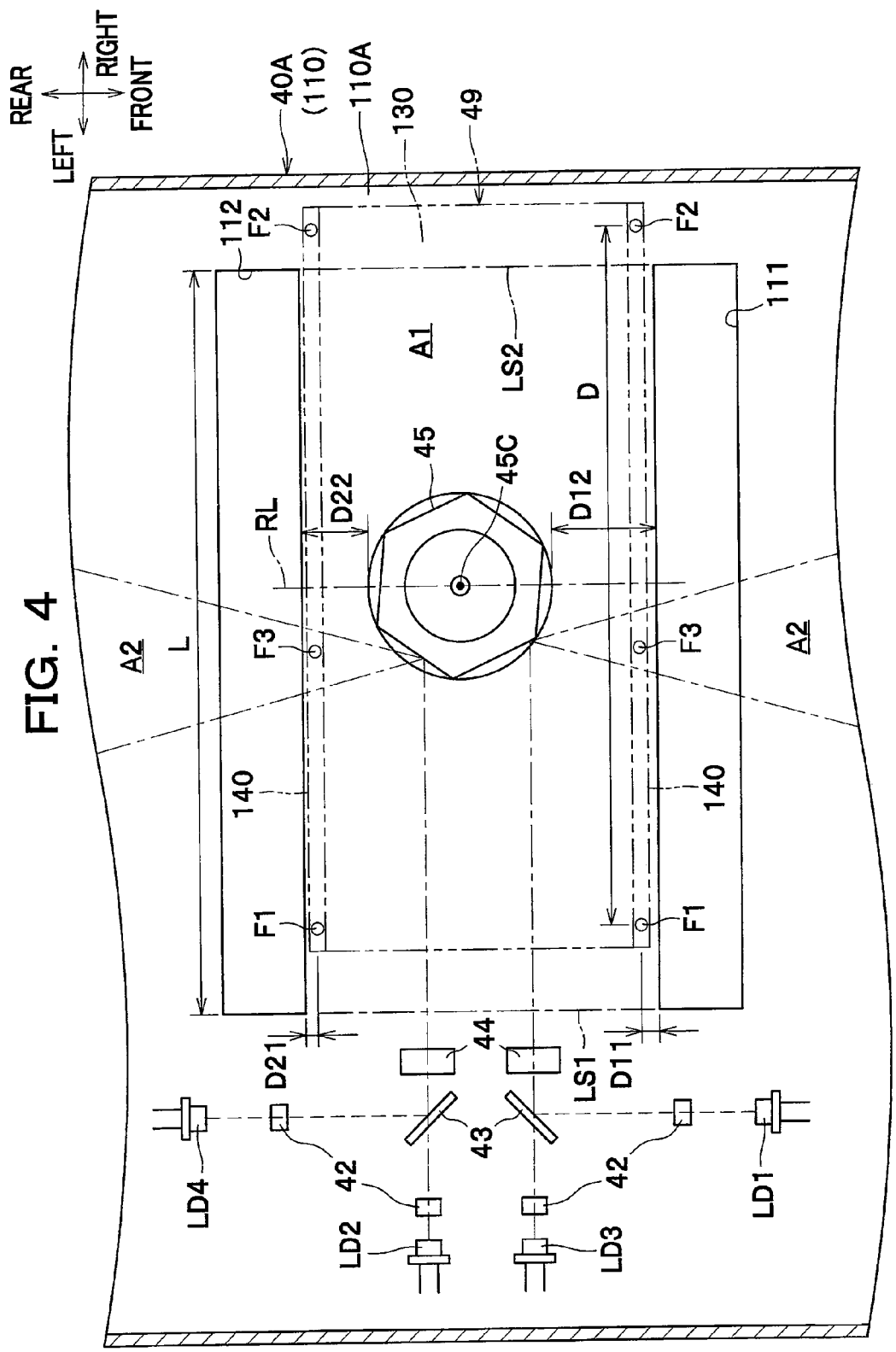
FIG. 4 is an enlarged plan view showing the configuration around a surrounding area of the optical scanner according to the first embodiment.

As seen in FIG. 4, the polygon mirror 45 is attached to the receiving frame 110 (i.e., bottom wall portion 110A) substantially at a center portion of or in the vicinity of a rectangular surrounding area A that is defined by the first exposure opening 111, the second exposure opening 112, a line segment LS1 connecting a left end of the first exposure opening 111 and a left end of the second exposure opening 112 (i.e., one end of the first exposure opening and one end of the second exposure opening), and a line segment LS2 connecting a right end of the first exposure opening 111 and a right end of the second exposure opening 112 (i.e., the other end of the first exposure opening and the other end of the second exposure opening). In FIG. 4, the fθ lenses 46, the reflecting mirrors 47, and the correcting mirrors 48 are omitted.

As best seen in FIG. 3, the lid frame 120 is made of resin, and is attached to the receiving frame 110 from above so as to cover the upper opening of the receiving frame 110. The lid frame 120 (i.e., upper wall portion 120A) is positioned opposite to the receiving frame 110 (i.e., bottom wall portion 110A) so that a reinforcement member 49 (i.e., upper frame 130) is interposed between the lid frame 120 and the receiving frame 110 in the vertical direction.

The reinforcement member 49 is substantially U-shaped configuration when viewed from the side, and consists of the upper frame 130 as an example of a second frame and a pair of connecting walls 140 as an example of at least one connecting member, which are integral with each other and made of resin.

The upper frame 130 is provided opposite to the receiving frame 110 (i.e., bottom wall portion 110A) on an upper side of the bottom wall portion 110A of the receiving frame 110 (i.e., on a side where the polygon mirror 45 is positioned). To be more specific, the upper frame 130 is provided opposite to the receiving frame 110 (i.e., bottom wall portion 110A) so as to interpose the polygon mirror 45 between the upper frame 130 and the receiving frame 110.

The connecting wall 140 is a wall extending in the main scanning direction, and is configured to connect the receiving frame 110 and the upper frame 130 in the surrounding area A1 (see FIG. 4). To be more specific, as best seen in FIG. 4, the connecting wall 140 (and the upper frame 130) is provided such that the right end portion thereof is positioned out of the surrounding area A1. Therefore, the connecting wall 140 connects the receiving frame 110 and the upper frame 130 while the major part of the connecting wall 140 is positioned in the surrounding area A1.

The connecting wall 140 is provided closely to the first exposure opening 111 (i.e., on the front side) and the second exposure opening 112 (i.e., on the rear side), respectively, with respect to the polygon mirror 45. Further, as viewed in the front-rear direction, a shortest distance D11 between each fixing position F1-F3 to be described later of the front side connecting wall 140 and the first exposure opening 111 is less than half a shortest distance D12 between the polygon mirror 45 and the first exposure opening 111. Similarly, as viewed in the front-rear direction, a shortest distance D21 between each fixing positions F1-F3 of the rear side connecting wall 140 and the second exposure opening 112 is less than half a shortest distance D22 between the polygon mirror 45 and the second exposure opening 112. In other words, each of the connecting wall 140 is provided more closely in the surrounding area A1 to an edge of the first exposure opening 111 or an edge of the second exposure opening 112 than to the polygon mirror 45.

Figure 5:
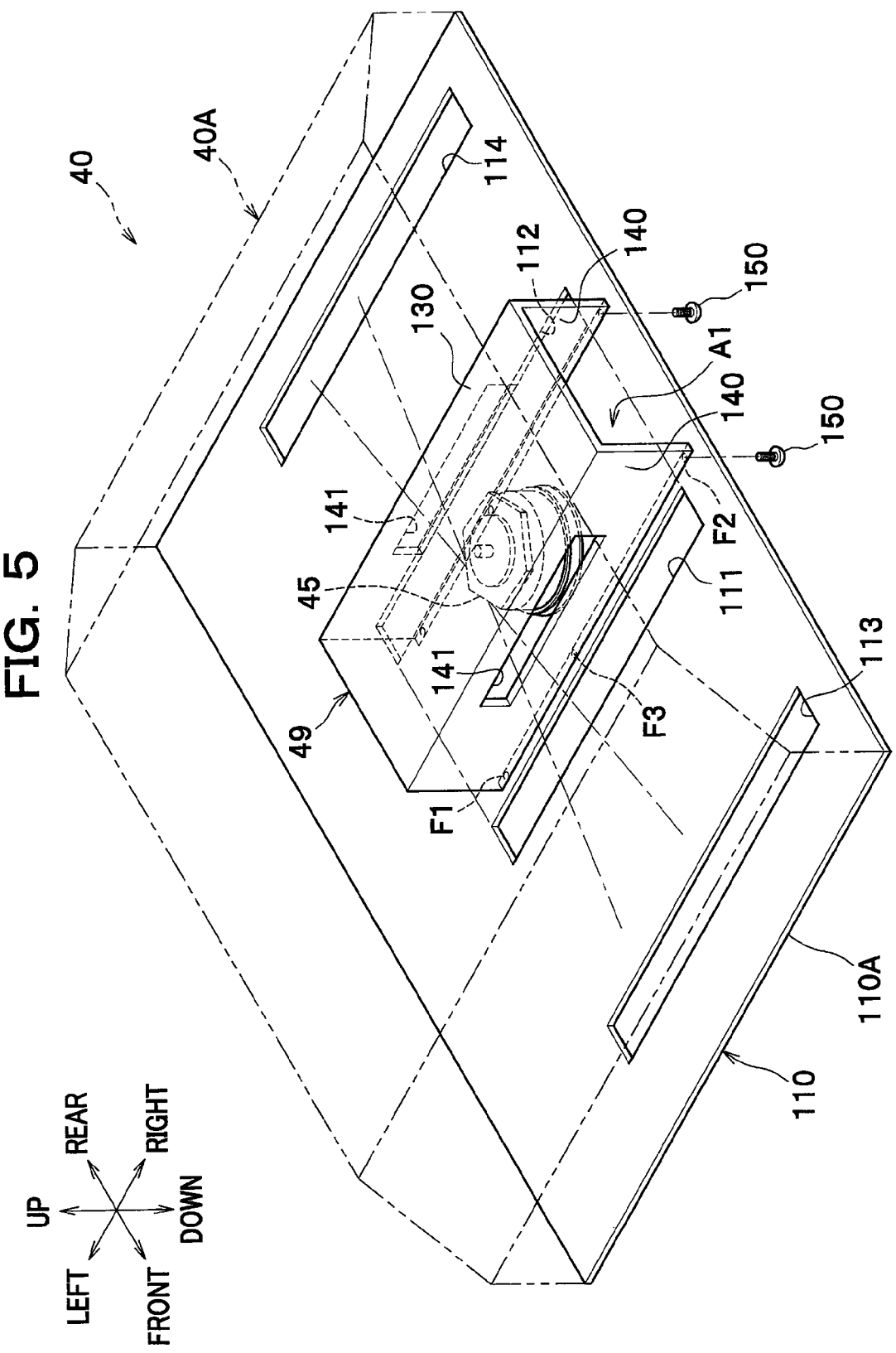
FIG. 5 is a perspective view illustrating main parts of the optical scanner according to the first embodiment.

As seen in FIG. 5, a rectangular opening 141 which extends longitudinally in the main scanning direction is formed in each connecting wall 140. This opening 141 allows the laser beams (see chain lines) reflected by the polygon mirror 45 to pass through. In FIG. 5, parts other than the casing 40A, the polygon mirror 45, and the reinforcement member 49 are omitted.

According to this embodiment, any optional members such as a transparent cover allowing transmission of a laser beam are not provided in the opening 141 of the connecting wall 140, so that an installation space of the polygon mirror 45 surrounded by the upper frame 130 and the pair of connecting walls 140 is directly in communication with the external space through the openings 141. The reinforcement member 49 opens at right and left sides without providing walls. Therefore, the polygon mirror 45 according to this embodiment is not sealed.

Each connecting wall 140 is fixed to the receiving frame 110 (i.e., bottom wall portion 110A) by screws 150 at a plurality of positions (i.e., three positions). To be more specific, the pair of connecting walls 140 are fixed to the receiving frame 110 at their two end positions in the main scanning direction (i.e., total of four positions) and at its one intermediate position between the two end positions (i.e., total of two positions). In the following description, positions at which the connecting wall 140 is fixed to the receiving frame 110 (i.e., bottom wall portion 110A) by screws 150 are referred to as "fixing positions" F1-F3.

As best seen in FIG. 4, among two end fixing positions F1, F2 located at both ends as viewed in the main scanning direction, a left-side fixing position F1 is located in the surrounding area A1, whereas a right-side fixing position F2 is located outside the surrounding area A1 at right side beyond the line segment LS2 connecting the right end of the first exposure opening 111 and the right end of the second exposure opening 112 (i.e., at right side of the first and second exposure openings 111, 112). Further, a distance D between two outermost fixing positions F1, F2 at both ends in the main scanning direction is greater than half of lengths L of the first exposure opening 111 and the second exposure opening 112 in the main scanning direction (i.e., D>L/2).

Accordingly, since the connecting wall 140 having a sufficiently large distance D between the fixing positions F1 and F2 is fixed to the receiving frame 110, the center portion of the surrounding area A1 where the amplitude of a resonance is greater and right-side and left-side portions of the surrounding area A1 where the amplitude of the resonance is smaller can be connected by the connecting wall 140.

As viewed from the sub-scanning direction (i.e., top), the fixing position F3 between the outermost fixing positions F1, F2 is located at a position overlapping with an effective scanning region A2, through which laser beams reflected from the polygon mirror 45 travel. In other words, each of the connecting walls 140 is fixed to the receiving frame 110 in an area where the effective scanning region A2 overlaps with the receiving frame 110 as viewed from top, namely in the proximity of the center portion of the surrounding area A1. The term "effective scanning region" indicates a region utilized for exposing the surface of the photoconductor drum 51 with the laser beam, that is, a region utilized for the image forming process, among the whole scanning region through which the laser beam reflected (deflected) from the polygon mirror 45 sweeps.

The plurality of fixing positions F1-F3 are asymmetrically arranged in an extension direction of the first exposure opening 111 and the second exposure opening 112 (i.e., right-left direction) with respect to the center (i.e., rotation center) 45C of the polygon mirror 45. To be more specific, the plurality of fixing positions F1-F3 are asymmetrical, as viewed from top, with respect to a reference line RL passing through the center 45C of the polygon mirror 45 and extending in the front-rear direction.

Advantageous Effects of Optical Scanner

According to the optical scanner 40 configured as described above, the following advantageous effects can be expected.

(1) The rigidity of the receiving frame 110 can be improved, especially at the surrounding area A1 to which the polygon mirror 45 is attached, because of a pair of connecting walls 140 configured to connect the upper frame 130 that is provided opposite to the receiving frame 110 and the surrounding area A1 of the receiving frame 110. As a result, a resonance of the receiving frame 110 (at the surrounding area A1) can be restricted during the operation of the polygon mirror 45 (at high speed rotation). This can prevent an image from being formed on a sheet P with unevenly developed colors, thereby ensuring the image quality of the color printer 1.

(2) Since the connecting walls 140 are provided inside the casing 40A (between the receiving frame 110 and the upper frame 130), the size of the casing 40A can be reduced, as compared with the configuration in which a reinforcement member for improving the rigidity is provided outside the casing 40A. Therefore, the size of the optical scanner 40, and hence the size of the color printer 1 equipped with this optical scanner 40 can be reduced.

(3) Since the connecting walls 140 are integrally formed with the upper frame 130, the rigidity of the receiving frame 110 can be improved when the connecting walls 140 are fixed to the receiving frame 110, as compared with the configuration in which the connecting walls 140 and the upper frame 130 are formed as discrete parts. Further, as compared with the latter structure, the number of assembling processes for the optical scanner 40 can be reduced, thereby facilitating the manufacture of the optical scanner 40.

(4) Each connecting wall 140 has the opening 141 for allowing the laser beams reflected by the polygon mirror 45 to pass therethrough. This makes it possible to improve the rigidity of the receiving frame 110 while ensuring a region through which the laser beams are allowed to pass.

(5) The connecting walls 140 are fixed to the receiving frame 110 in an area where the effective scanning region A2, through which the laser beams reflected from the polygon mirror 45 travel, overlaps with the receiving frame 110 (i.e., in the proximity of the center portion of the surrounding area A1). This can further improve the rigidity of the receiving frame 110, as compared with the configuration in which the connecting walls 140 are fixed to the receiving frame 110 only at both end portions adjacent to the both ends of the surrounding area A1 in the main scanning direction.

(6) Since the distance D between the outermost fixing positions F1, F2 of the connecting wall 140 is greater than half of lengths L of the first exposure opening 111 and the second exposure opening 112, the center portion of the surrounding area A1 and right-side and left-side portions of the surrounding area A1 can be connected by the connecting walls 140. Therefore, it is possible to restrict a resonance of the receiving frame 110, especially at or in the proximity of the center portion of the surrounding area A1 in a more reliable manner.

(7) Since the plurality of fixing positions F1-F3 are asymmetrically arranged in the right-left direction with respect to the center 45C of the polygon mirror 45, the receiving frame 110 and the connecting wall 140 (i.e., reinforcement member) can be connected by utilizing as a fixing position (i.e., fixing position F2) an area near the side wall of the receiving frame 110 where a resonance hardly occurs. This arrangement of the fixing positions F1-F3 further improves the rigidity of the receiving frame 110.

(8) Among the plurality of fixing positions F1-F3, one fixing position F2 is located outside the surrounding area A1, namely at an area where the rigidity of the receiving frame 110 (i.e., bottom wall portion 110A) is relatively high. Therefore, this external area, outside the surrounding area A, where a resonance hardly occurs can be connected by the connecting wall 140 to the center portion of the surrounding area A1 where a resonance possibly occurs. This arrangement of the fixing position F2 further restricts a resonance of the receiving frame 110, particularly in the proximity of the center portion of the surrounding area A1.

(9) Since the lid frame 120 is arranged opposite to the receiving frame 110 so as to interpose the upper frame 130 between the lid frame 120 and the receiving frame 110 and the lid frame 120 and the receiving frame 110 constitute the casing 40A of the optical scanner 40, the lid frame 120 and the upper frame 130 (reinforcement member 49) can be provided as discrete parts. Therefore, the reinforcement member 49 (connecting wall 140) can be secured to the receiving frame 110 under no influence of tolerance which possibly arises when the lid frame 120 is attached to the receiving frame 110 for assembly of the casing 40A. As a result, the rigidity of the receiving frame 110 can be improved in a more reliable manner.

(10) The front-side and rear-side connecting walls 140 are provided more closely in the surrounding area A1 to the edge of the first exposure opening 111 or the edge of the second exposure opening 112 (where the amplitude of the resonance is greater) than to the polygon mirror 45. Therefore, a resonance of the receiving frame 110 can be restricted, particularly at the edge of the first exposure opening 111 and at the edge of the second exposure opening 112.

According to the above embodiment, the upper frame 130 (i.e., second frame) and the connecting walls 140 (i.e., connecting members) are made of resin. However, the present invention is not limited to this specific configuration. For example, the second frame and the connecting members may be made of metal. In general, metal has a greater rigidity than resin, so that if the second frame and the connecting members are made of metal, the rigidity of the receiving frame 110 can be improved further.

According to the above embodiment, among the plurality of fixing positions F1-F3, only one fixing position F2 is located outside the surrounding area A1. However, the present invention is not limited to this specific arrangement, and two or more fixing positions may be located outside the surrounding area A1.

<Second Embodiment>

A second exemplary embodiment of the present invention will be described. In the following description, like parts similar to those previously described in the first embodiment are denoted by the same reference numerals, and detailed description thereof will be omitted.

Figure 6:
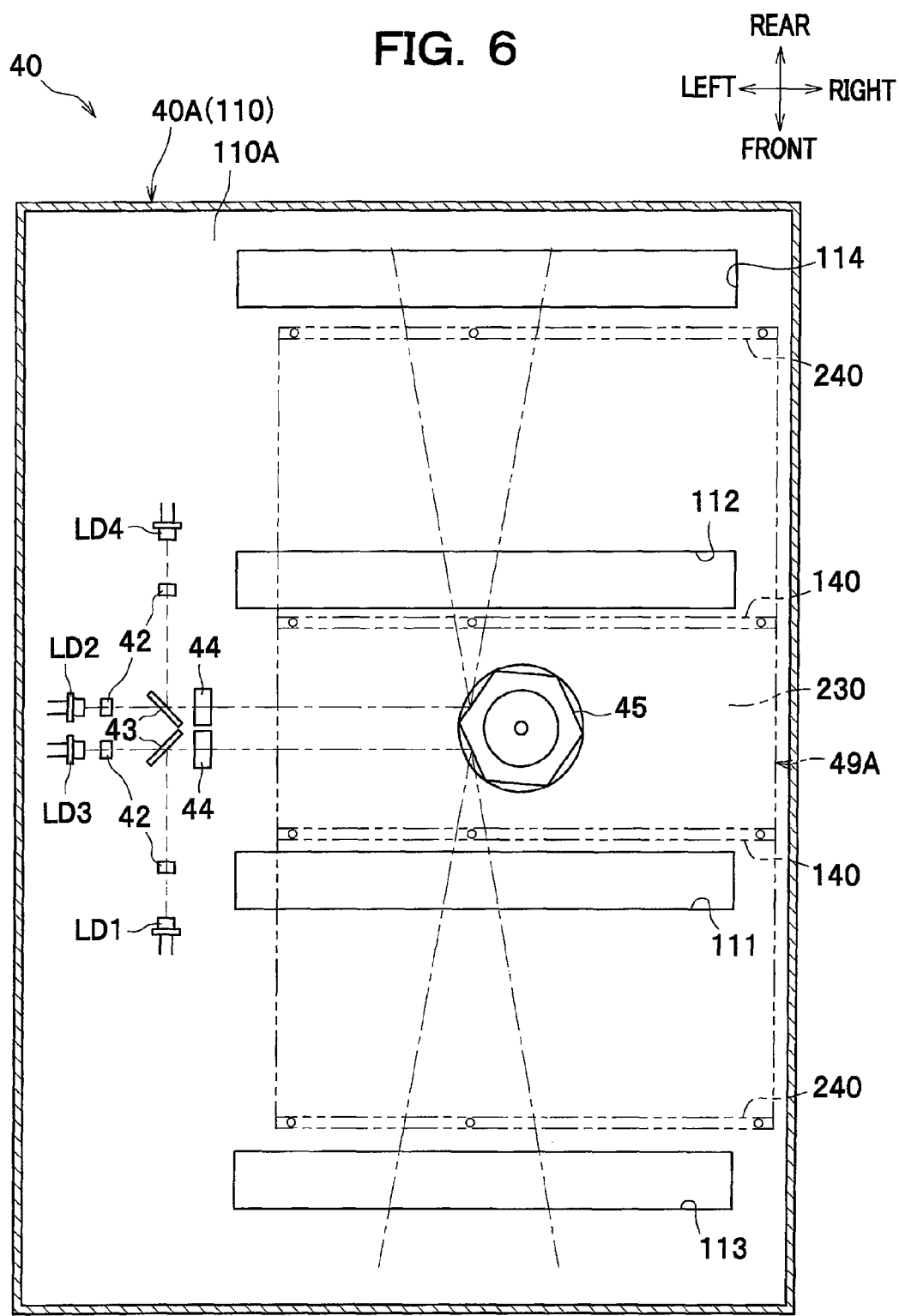
FIG. 6 is a plan view of an optical scanner according to a second embodiment of the present invention.
Figure 7:
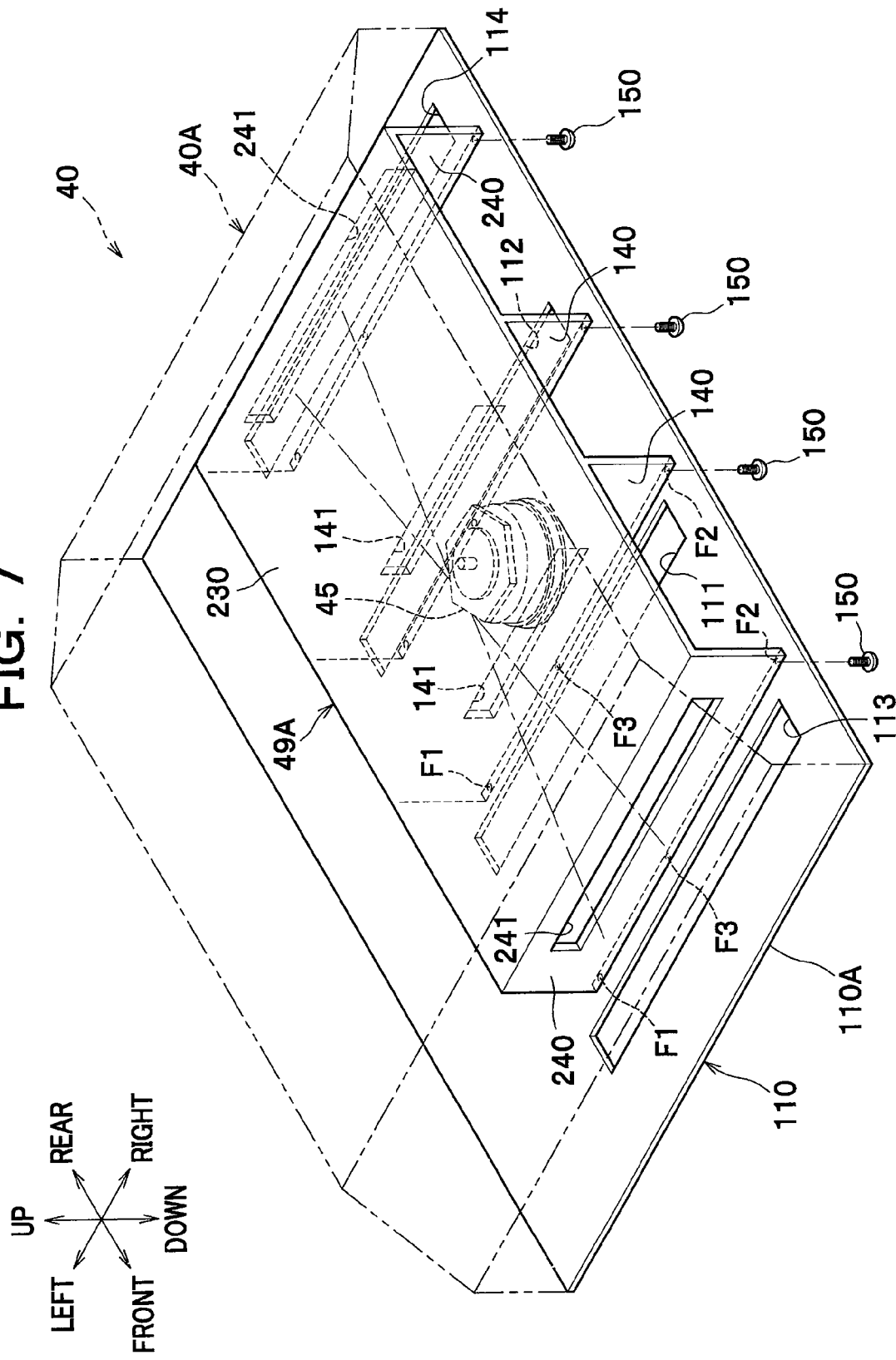
FIG. 7 is a perspective view illustrating main parts of the optical scanner according to the second embodiment.

As best seen in FIGS. 6 and 7, the optical scanner 40 according to the second embodiment mainly includes semiconductor lasers LD1-LD4, collimating lenses 42, reflecting mirrors 43, cylindrical lenses 44, a polygon mirror 45, fθ lenses (not shown), reflecting mirrors (not shown), correcting lenses (not shown), and a reinforcement member 49A, in a casing 40A of the optical scanner 40.

The reinforcement member 49A consists of an upper frame 230, and two connecting walls 140 and two connecting walls 240 as an example of the connecting members. The upper frame 230 and the connecting walls 140, 240 are integral with each other and made of resin.

The upper frame 230 is of a rectangular configuration as viewed from top. The upper frame 230 is provided opposite to the surrounding area A1 (see FIG. 4) of the receiving frame 110 (i.e., upper surface of the bottom wall portion 110A to which the polygon mirror 45 is attached), an area between the first exposure opening 111 and the third exposure opening 113, and an area between the second exposure opening 112 and the fourth exposure opening 114.

As with the connecting walls 140, the connecting walls 240 are walls extending in the main scanning direction, and are configured to connect the receiving frame 110 (i.e., bottom wall portion 110A) and the upper frame 230 in the area between the first exposure opening 111 and the third exposure opening 113 and in the area between the second exposure opening 112 and the fourth exposure opening 114. In other words, two connecting walls 240 are arranged in the front-rear direction to interpose therebetween the two connecting walls 140.

The front-side connecting wall 240 is provided closely to the third exposure opening 113 in the area between the first exposure opening 111 and the third exposure opening 113, whereas the rear-side connecting wall 240 is provided closely to the fourth exposure opening 114 in the area between the second exposure opening 112 and the fourth exposure opening 114.

A rectangular opening 241 which extends longitudinally in the main scanning direction is formed in each connecting wall 240. This opening 241 allows the laser beams (see chain lines) reflected by the polygon mirror 45 to pass through. The opening 241 of the connecting wall 240 has a length longer in the main scanning direction than that of the opening 141 of the connecting wall 140.

As with the connecting wall 140, each connecting wall 240 is fixed to the receiving frame 110 (i.e., bottom wall portion 110A) by screws 150 at a plurality of positions (i.e., three fixing positions F1-F3).

According to the optical scanner 40 configured as described above in this embodiment, the same advantageous effects as those described in the first embodiment can be expected.

(11) Further, the connecting member (i.e., connecting wall 240) is provided also in the area between the first exposure opening 111 and the third exposure opening 113 and in the area between the second exposure opening 112 and the fourth exposure opening 114. Therefore, the rigidity of the receiving frame 110 can be further improved.

Figure 8:
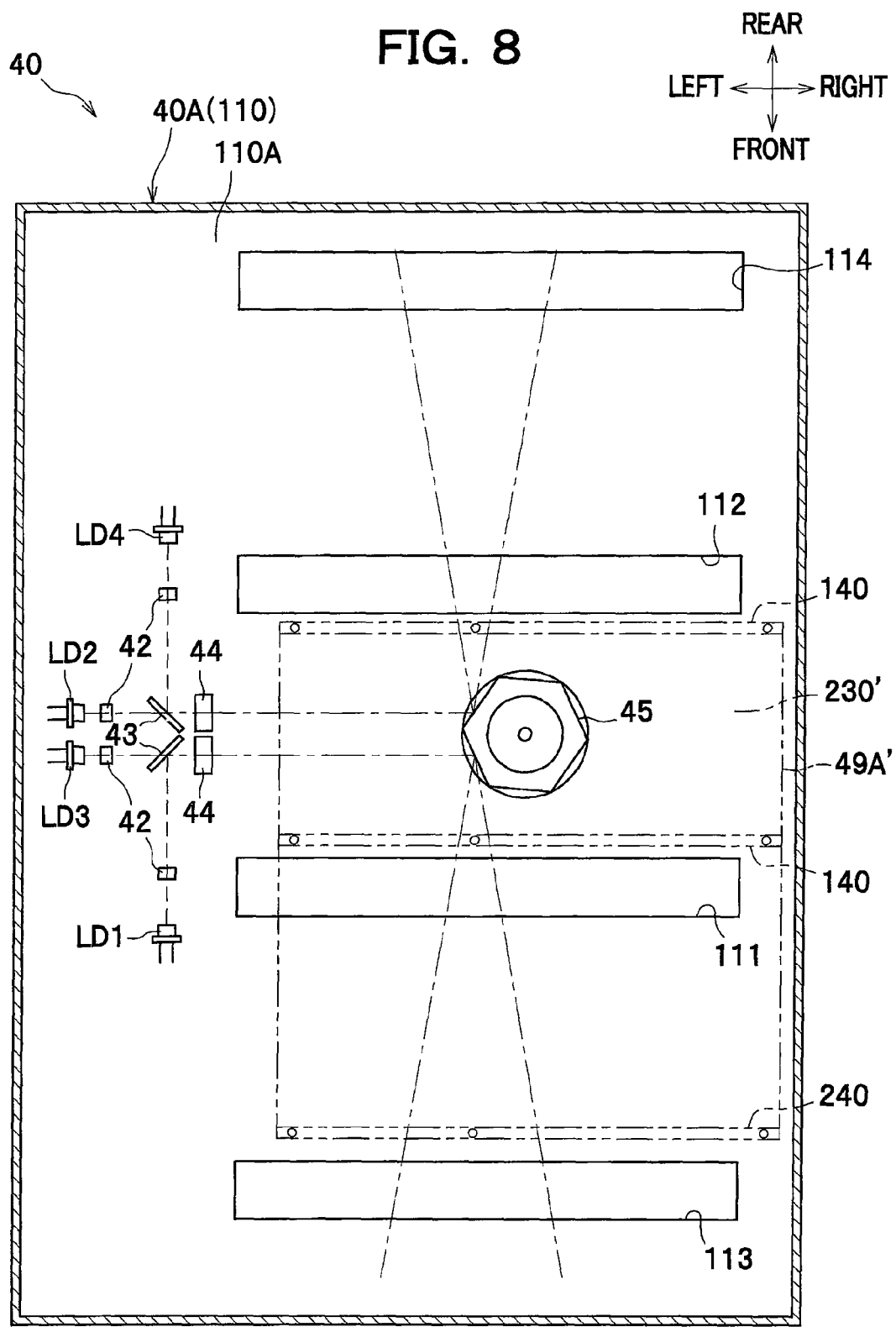
FIG. 8 is a plan view of an optical scanner according to a modification of the second embodiment.

According to the second embodiment, the connecting wall 240 is provided both in the area between the first exposure opening 111 and the third exposure opening 113 and in the area between the second exposure opening 112 and the fourth exposure opening 114. However, the present invention is not limited to this specific configuration. For example, as best seen in FIG. 8, the connecting wall 240 may be provided only in the area between the first exposure opening 111 and the third exposure opening 113. As an alternative, although not shown in the drawings, the connecting wall 240 may be provided only in the area between the second exposure opening 112 and the fourth exposure opening 114.

In the above first and second embodiments, the fixing positions F1-F3 are located in the same positions for all the connecting walls 140, 240. However, the present invention is not limited to this specific arrangement. The connecting walls 140, 240 may be fixed to the receiving frame 110 at different positions such that the pair of connecting walls 140 and the pair of connecting walls 240 are fixed at different fixing positions or that each of the connecting walls 140, 140, 240, 240 has different fixing positions, respectively. This can also be said to the number of fixing positions.

In the above first and second embodiments, the connecting walls 140, 240 (i.e., connecting members) are provided such that two connecting walls 140 are provided in the surrounding area A1 and one connecting wall 240 is provided both in the area between the first exposure opening 111 and the third exposure opening 113 and in the area between the second exposure opening 112 and the fourth exposure opening 114. However, the present invention is not limited to this specific configuration. For example, two or more connecting walls 240 may be provided in the area between the first exposure opening 111 and the third exposure opening 113 and/or in the area between the second exposure opening 112 and the fourth exposure opening 114. Further, two or more connecting walls 140 may be provided in the surrounding area A1, for example, respectively at the front-side and the rear-side of the polygon mirror 45. The number of the connecting walls 140 may be different at the front-side and at the rear-side. In this instance, the plurality of connecting walls 140, 240 may be arranged in series along the front-rear direction or arranged in line along the right-left direction.

<Third Embodiment>

A third embodiment of the present invention will be described.

Figure 9:
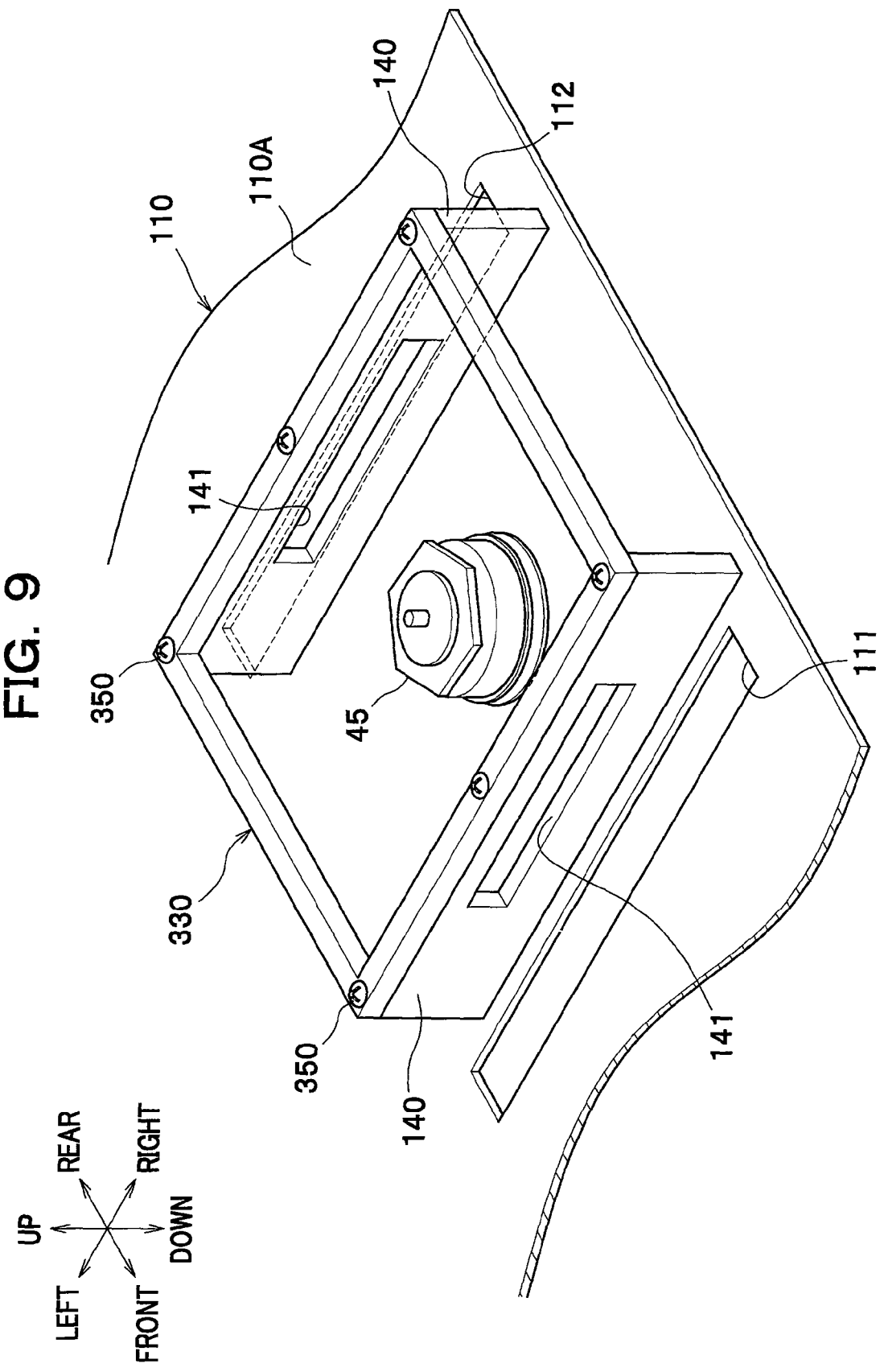
FIG. 9 is a perspective view illustrating main parts of an optical scanner according to a third embodiment of the present invention.

In the first embodiment, the connecting walls 140 (i.e., connecting members) are integral with the upper frame 130 (i.e., second frame). However, the present invention is not limited to this specific configuration. For example, as best seen in FIG. 9, the connecting walls 140 (i.e., connecting members) may be integral with the receiving frame 110 (i.e., first frame).

As another example of the second frame, the upper frame 330 is a rectangular frame having a center opening. The upper frame 330 is provided opposite to the upper surface of the receiving frame 110 (i.e., upper surface of the bottom wall portion 110A) to which the polygon mirror 45 is attached. The upper frame 330 is fixed to the connecting walls 140 by screws 350 at a plurality of fixing positions of its front-side portion and rear-side portion.

According to the optical scanner configured as described above in this embodiment, the same advantageous effects as those described in the first embodiment can be expected.

(12) Further, since the connecting walls 140 are integrally formed with the receiving frame 110, as with the first embodiment, the rigidity of the receiving frame 110 can be improved, as compared with the configuration in which the connecting walls 140, the receiving frame 110, and the upper frame 330 are formed as discrete parts. Further, the number of assembling process for the optical scanner can be reduced, thereby facilitating the manufacture of the optical scanner.

In the above first to third embodiments, the connecting members (i.e., connecting walls 140) are fixed to the receiving frame 110 (i.e., first frame) or the upper frame 330 (i.e., second frame) by screws at a plurality of fixing positions. However, the present invention is not limited to this specific configuration. For example, the whole fixing surface (i.e., lower surface or upper surface of the connecting walls 140) may be fixed to the first frame or the second frame with adhesive.

In the above first to third embodiments, the connecting walls 140 (i.e., connecting members) are integrally formed with the upper frame 130 (i.e., second frame) or the receiving frame (i.e., first frame). However, the present invention is not limited to this specific configuration, and the connecting member may be a discrete part that is separately formed from the first and second frames.

<Fourth Embodiment>

A fourth embodiment of the present invention will be described.

Figure 10:
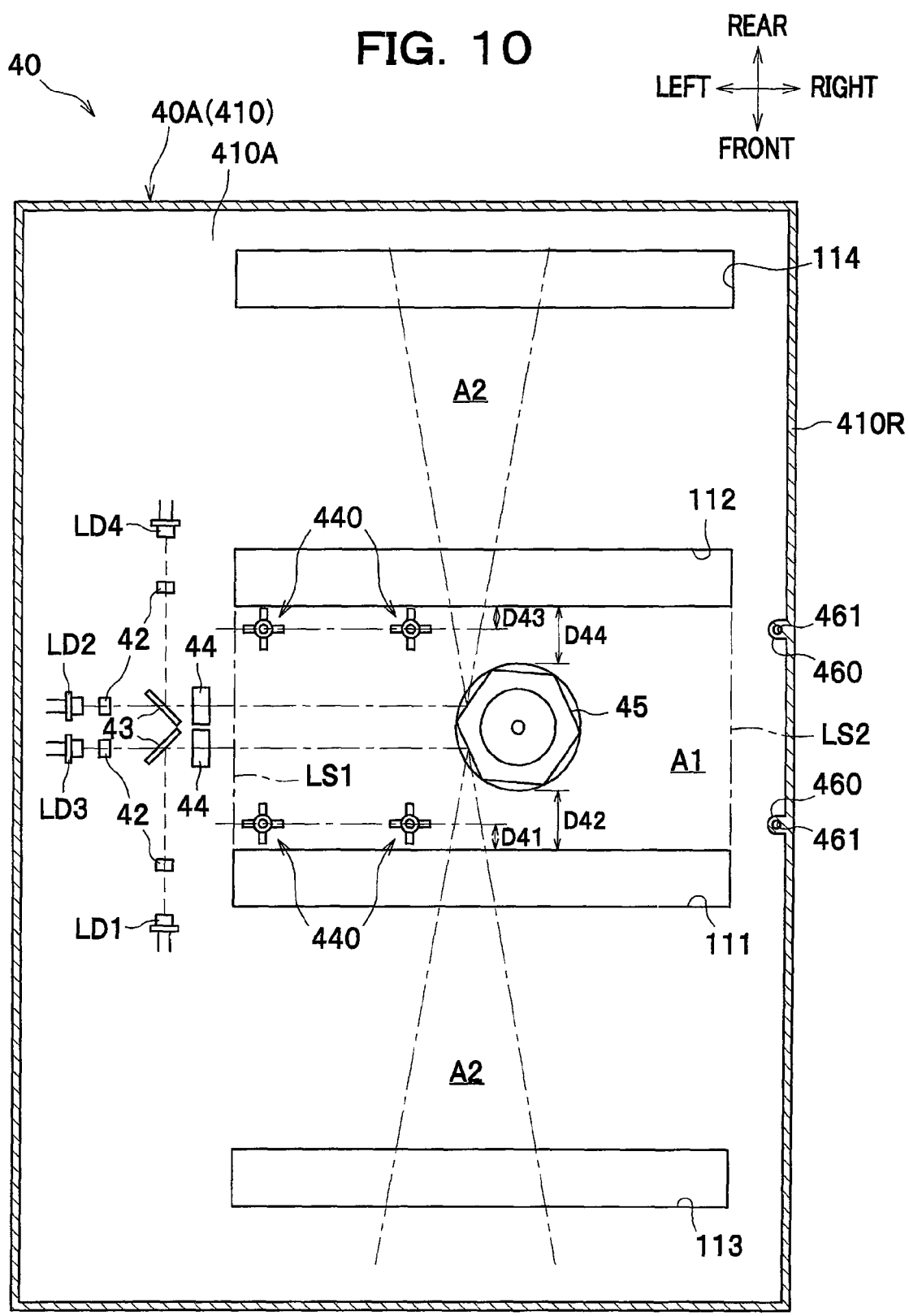
FIG. 10 is a plan view of an optical scanner according to a fourth embodiment of the present invention.
Figure 11:
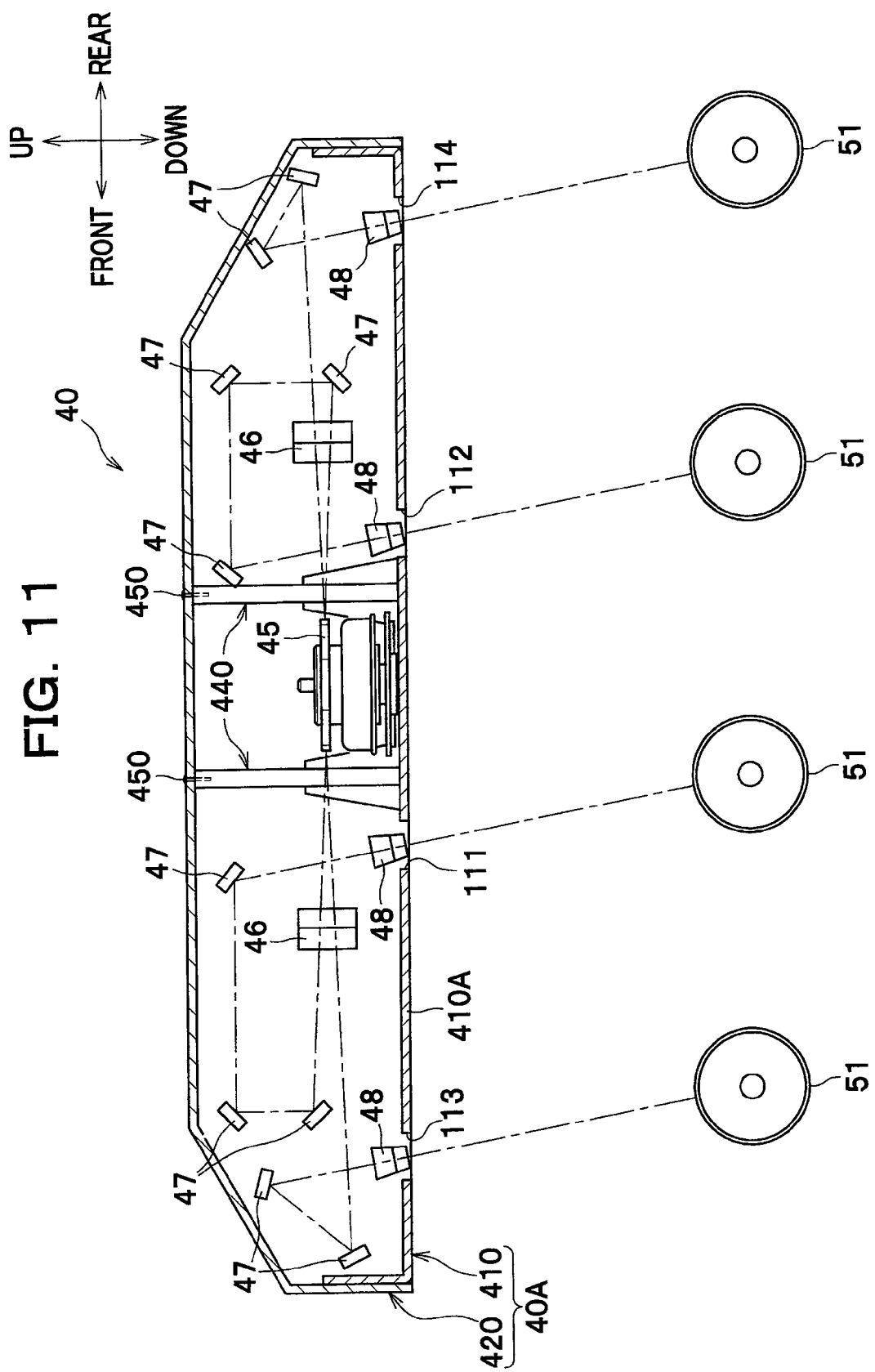
FIG. 11 is a side sectional view of the optical scanner according to the fourth embodiment.

As best seen in FIGS. 10 and 11, the optical scanner 40 according to the fourth embodiment mainly includes semiconductor lasers LD1-LD4, collimating lenses 42, reflecting mirrors 43, cylindrical lenses 44, a polygon mirror 45, fθ lenses 46, reflecting mirrors 47, and correcting lenses 48, in a casing 40A of the optical scanner 40.

The casing 40A mainly comprises a receiving frame 410 (i.e., first frame) and a lid frame 420 as another example of the second frame.

The receiving frame 410 is made of resin and is substantially of an open box shape having an opening at its top. Parts such as the semiconductor lasers LD1-LD4 and the polygon mirror 45 are mounted in the receiving frame 410 (i.e., on the upper surface of the bottom wall portion 410A). The receiving frame 410 has four exposure openings 111-114, connecting bosses 440 as another example of the connecting member, and fixing portions 460, which are integrally formed with each other.

Figure 12A:
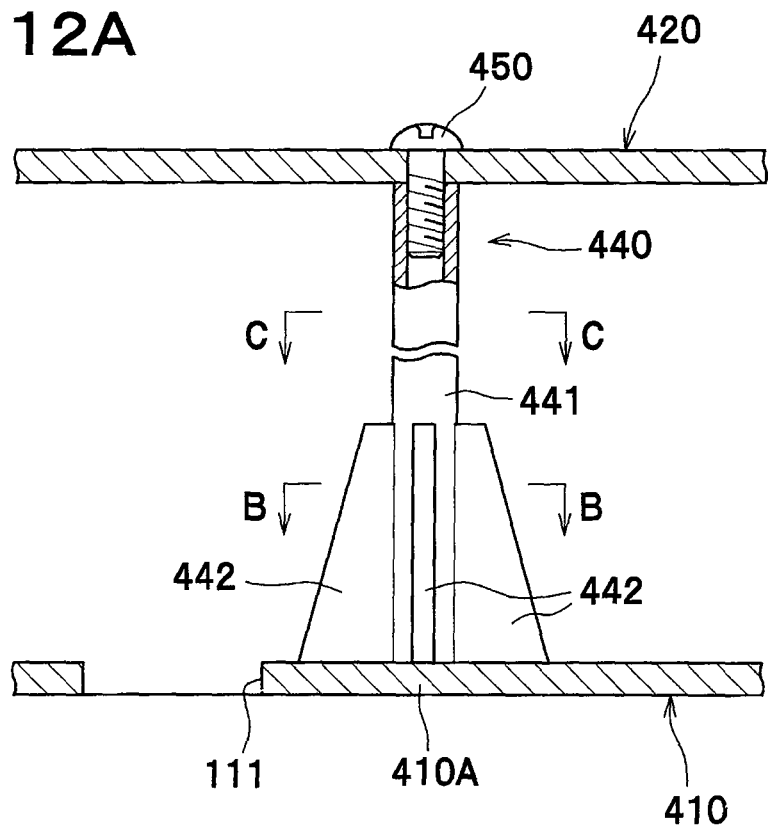

As best seen in FIG. 12A, each connecting boss 44 is shaped as a column extending upward from the upper surface of the bottom wall portion 410A of the receiving frame 410. The upper ends of the connecting bosses 44 are fixed to the lid frame 420 by screws 450, so that the receiving frame 410 and the lid frame 420 are connected together.

Figure 12B:
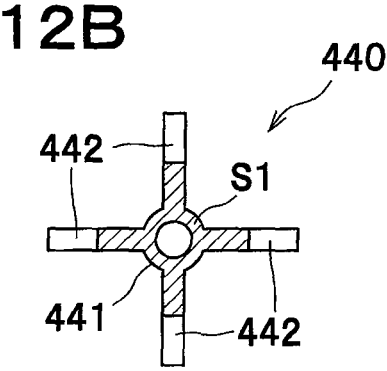
Figure 12C:
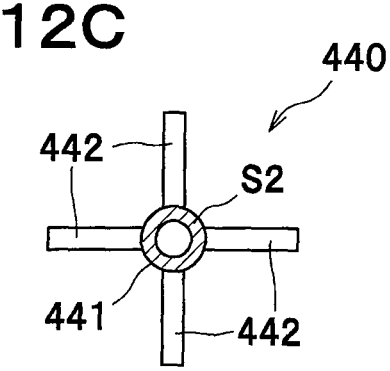

The connecting boss 440 includes a substantially cylindrical main body 441 extending in the sub-scanning direction (i.e., vertical direction), and four extensions 442 extending outward from a lower peripheral surface of the main body 441 at equally-spaced intervals so that a substantially crisscross arrangement of the four extensions 242 is provided around the periphery of the main body 441. According to this configuration of the connecting boss 440, as best seen in FIGS. 12B and 12C, when cutting along a plane that is orthogonal to a direction in which the connecting boss 440 extends (i.e., vertical direction), the connecting boss 440 has a sectional area S1 that is wider at the receiving frame 410 side (i.e., lower-side portion) than a sectional area S2 that is narrower at the lid frame 420 side (i.e., upper-side portion).

As seen in FIG. 10, the plurality of (i.e., four) connecting bosses 440 are provided in the surrounding area A1 but outside the effective scanning region A2 through which the laser beams (see chain lines) reflected from the polygon mirror 45 travel. To be more specific, two connecting bosses 440 each are provided at the front-side near the first exposure opening 111 and at the rear-side near the second exposure opening 112, respectively, with respect to the polygon mirror 45. Further, the two right-hand side connecting bosses 440 are closely located to the effective scanning region A2, whereas the two left-side connecting bosses 440 are closely located to the left end (i.e., line segment LS1) of the surrounding area A1.

As viewed in the front-rear direction, a shortest distance D41 between the fixing position (i.e., center) of each front-side connecting boss 440 and the first exposure opening 111 is less than half a shortest distance D42 between the polygon mirror 45 and the first exposure opening 111. Similarly, as viewed in the front-rear direction, a shortest distance D43 between the fixing position (i.e., center) of each rear-side connecting boss 440 and the second exposure opening 112 is less than half a shortest distance D44 between the polygon mirror 45 and the second exposure opening 112. In other words, each of the connecting bosses 440 is provided more closely in the front-rear direction to the edge of the first exposure opening 111 or the edge of the second exposure opening 112 than to the polygon mirror 45.

Two fixing portions 460 are provided on the inner surface of the right-side wall 410R of the receiving frame 410 at positions opposite to the connecting bosses 440 in the main scanning direction. Each fixing portion 460 has a substantially semi-cylindrical shape extending upward from the bottom wall portion 410A, and a screw hole 461 is formed in the upper end of the fixing portion 460. The lid frame 420 is fixed to the fixing portions 460 by screws (not shown).

As best seen in FIG. 11, the lid frame 420 is made of resin, and is attached to the receiving frame 410 from above so as to cover the upper opening of the receiving frame 410. Accordingly, the lid frame 420 is provided opposite to the receiving frame 410 (i.e., bottom wall portion 410A) on an upper side of the receiving frame 410 where the polygon mirror 45 is positioned. Further, the lid frame 420 is fixed to the four connecting bosses 440 and the two fixing portions 460 by screws. Therefore, the connecting bosses 440 connects the receiving frame 410 and the lid frame 420.

According to the optical scanner 40 configured as described above in this embodiment, the following advantageous effects can be expected.

(13) The rigidity of the receiving frame 410 can be improved, especially at the surrounding area A1 to which the polygon mirror 45 is attached, because of the connecting bosses 440 configured to connect the lid frame 420 that is provided opposite to the receiving frame 410 and the surrounding area A1 of the receiving frame 410. As a result, a resonance of the receiving frame 410 can be restricted during the high speed rotation of the polygon mirror 45.

(14) Since the connecting bosses 440 are provided inside the casing 40A (between the receiving frame 410 and the lid frame 420), the size of the casing 40A can be reduced, as compared with the configuration in which a reinforcement member for improving the rigidity is provided outside the casing 40A. Therefore, the size of the optical scanner 40, and hence the size of the color printer 1 equipped with this optical scanner 40 can be reduced.

(15) Since the connecting bosses 440 are integrally formed with the receiving frame 410, the rigidity of the receiving frame 410 can be improved when the lid frame 420 is fixed to the connecting bosses 440, as compared with the configuration in which the connecting bosses 440 and the receiving frame 410 are formed as discrete parts. Further, the number of assembling process for the optical scanner 40 can be reduced, thereby facilitating the manufacture of the optical scanner 40.

(16) The connecting bosses 440 are provided outside the effective scanning region A2 through which the laser beams reflected from the polygon mirror 45 travel. Therefore, the rigidity of the receiving frame 410 can be improved without interfering with transmission of the laser beams.

(17) Since a plurality of connecting bosses 440 are provided in the surrounding area A1, a resonance of the receiving frame 410 (i.e., at the surrounding area A1) can be restricted in an effective and reliable manner.

(18) Since the receiving frame 410 and the lid frame 420 constitute the casing 40A of the optical scanner 40, a resonance of the receiving frame 410 can be restricted by a simple structure, as compared with the configuration in which another frame is provided between the receiving frame 410 and the lid frame 420 and the another frame and the receiving frame 410 are connected by the connecting bosses 440.

(19) When cutting along a plane that is orthogonal to the vertical direction, the connecting boss 440 has a sectional area S1 that is wider at the receiving frame 410 side than a sectional area S2 that is narrower at the lid frame 420 side. This makes is possible to further improve the rigidity of the receiving frame 410 which is likely to resonate. Therefore, a resonance of the receiving frame 410 can be restricted in a more reliable manner.

(20) The front-side and rear-side connecting bosses 440 are provided more closely in the front-rear direction to the edge of the first exposure opening 111 or the edge of the second exposure opening 112 (where the amplitude of the resonance is greater) than to the polygon mirror 45. Therefore, a resonance of the receiving frame 410 can be restricted, particularly at the edge of the first exposure opening 111 and at the edge of the second exposure opening 112.

(21) The lid frame 420 is fixed not only to the connecting bosses 440 but also to the fixing portions 460 provided at the right-side wall 410R of the receiving frame 410. Therefore, the rigidity of the receiving frame 410 can be improved in a reliable manner while reducing the number of connecting bosses 440.

In the above embodiment, the connecting bosses 440 (i.e., connecting members) are integral with the receiving frame 410 (i.e., first frame). However, the present invention is not limited to this specific configuration. For example, the connecting bosses 440 (i.e., connecting members) may be integral with the lid frame 420 (i.e., second frame). Further, the connecting member may be a discrete part that is separately formed from the first and second frames.

In the above embodiment, all the connecting bosses 440 are provided in the surrounding area A1. However, the present invention is not limited to this specific arrangement, and some of the connecting bosses 440 may be provided outside the surrounding area A1. For example, the fixing portions 460 may be replaced with connecting bosses 440.

Figure 13:
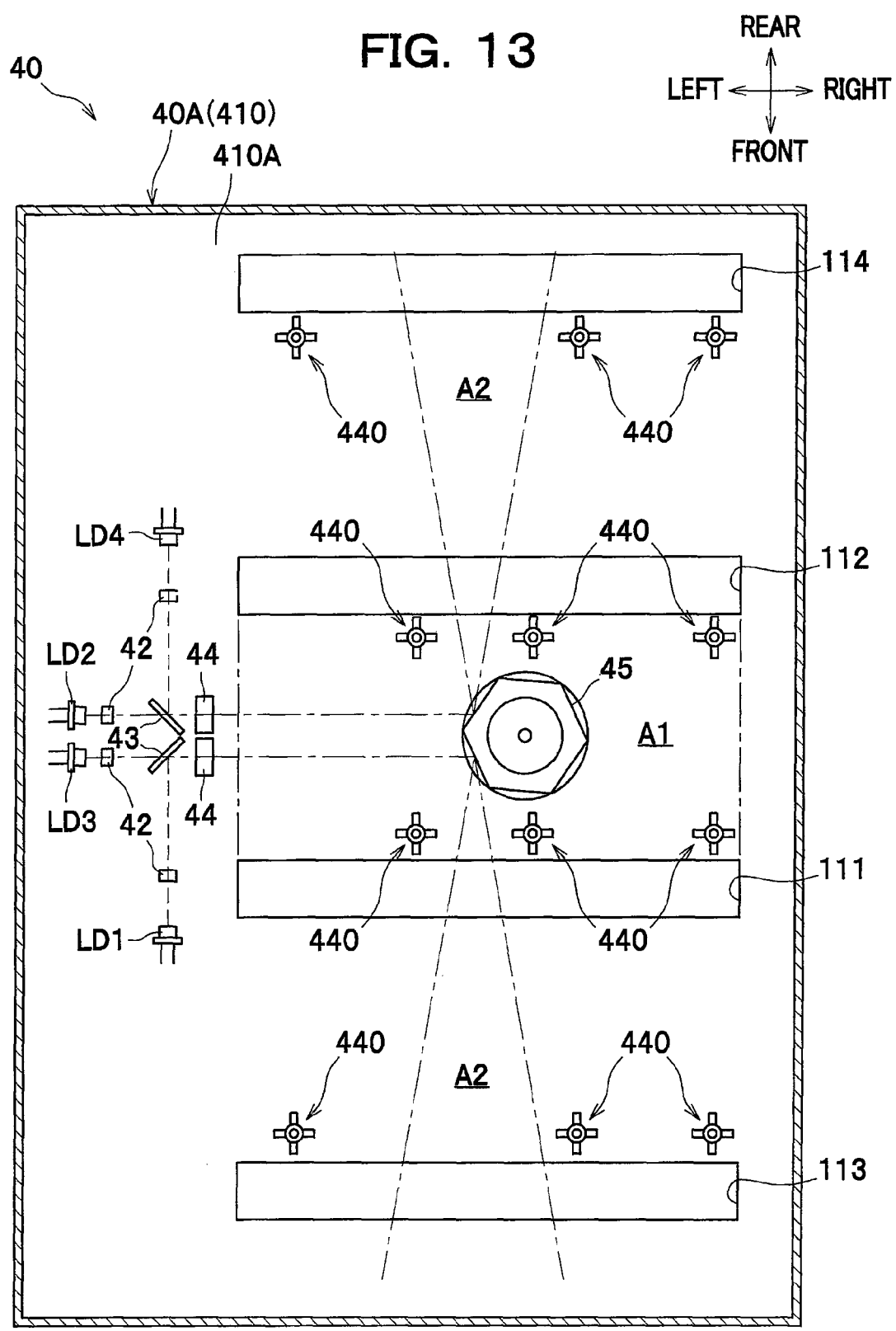
FIG. 13 is a plan view of an optical scanner according to a modification of the fourth embodiment.

Further, as seen in FIG. 13, the connecting bosses 440 may be configured to connect the receiving frame 410 and the lid frame 420 at an area between the first exposure opening 111 and the third exposure opening 113 and at an area between the second exposure opening 112 and the fourth exposure opening 114. With this configuration, the rigidity of the receiving frame 410 can be further improved.

According to this modification as shown in FIG. 13, a distance in the main scanning direction between the two connecting bosses 440 which are arranged in the surrounding area A1 to interpose the effective scanning region A2 is smaller than a distance in the main scanning direction between the two connecting bosses 440 which are arranged to interpose the effective scanning region A2 in an area between the first exposure opening 111 and the third exposure opening 113 and in an area between the second exposure opening 112 and the fourth exposure opening 114.

With this arrangement of the connecting bosses 440, the connecting bosses 440 are arranged closely to the center portion of the surrounding area A1 with respect to the main scanning direction, and the center portion of the surrounding area A1 where the amplitude of a resonance is greater can be connected to the lid frame 420 by the connecting bosses 440. Therefore, a resonance of the receiving frame 410 can be restricted, particularly at or in the proximity of the center portion of the surrounding area A1.

In the case where the connecting bosses 440 are provided in an area between the first exposure opening 111 and the third exposure opening 113 and in an area between the second exposure opening 112 and the fourth exposure opening 114, the connecting bosses 440 may be provided in both areas as shown in FIG. 13. As an alternative, the connecting bosses 440 may be provided in one of these areas.

Although the present invention has been described in detail with reference to the above exemplary embodiments, the present invention is not limited to these specific embodiments. It is to be understood that various changes and modifications may be made for specific configurations without departing from the scope of the appended claims.

In the above embodiments, a plurality of connecting members (i.e., connecting walls 140; connecting bosses 440) are provided in the surrounding area A1. However, the number of the connecting members provided in the surrounding area A1 is not specifically limited as long as at least one connecting member is provided in the surrounding area A 1.

In the above embodiments, one of the wall-shaped connecting members (i.e., connecting walls 140) and the columnar connecting members (i.e., connecting bosses 440) are employed. However, the present invention is not limited to this specific configuration, and both of the wall-shaped connecting members and the columnar connecting members may be employed.

In the above embodiments, the semiconductor lasers LD1-LD4 are employed as light sources. However, light sources each configured to emit a laser beam, such as a laser array, may be employed instead.

In the above embodiments, as an example of the light deflector, there is provided the polygon mirror 45 configured to rotate at high speeds so as to reflect at reflecting faces the laser beams to thereby deflect the laser beams in the main scanning direction for scanning the target surfaces. However, the present invention is not limited to this specific configuration. For example, the polygon mirror 45 may be replaced with a vibrating mirror configured to have reflecting surfaces which oscillate (vibrate) to reflect and deflect a laser beam in the main scanning direction for scanning, such as a MEMS mirror and a vibrating mirror.

In the above embodiments, the substantially box-shaped receiving frames 110, 410 are employed as the first frame. However, the first frame may be plate-shaped. Similarly, the lid frame 120, 420 (i.e., second frame; third frame) may be plate-shaped and configured to cover the upper opening of the box-shaped receiving frame 110, 410 from above.

In the above embodiments, the arrangement of the optical components such as lenses and reflecting mirrors is explained by way of example only, and the present invention is not limited to this arrangement. The arrangement of the optical components may be modified, where necessary, without departing from the scope of the appended claims.

In the above embodiments, the optical scanner 40 according to the present invention is applied to the color printer 1. However, the present invention is not limited to this specific example. For example, the present invention may be used in any other image forming apparatuses such as color copying machine and color multifunction device, and other measuring apparatuses and testing apparatuses other than the image forming apparatus.

What is claimed is:

1. An optical scanner for scanning target surfaces with laser beams comprising:

first and second light sources each configured to emit a laser beam;

a light deflector configured to reflect the laser beams from the first and second light sources so as to deflect the laser beams in a main scanning direction for scanning the target surfaces; and a first frame on which the first light source, the second light source, and the light deflector are mounted, wherein the first frame has a first exposure opening extending in the main scanning direction and configured to allow the laser beam emitted from the first light source to pass therethrough from an interior of the optical scanner toward a corresponding target surface outside the optical scanner, and a second exposure opening extending in the main scanning direction and configured to allow the laser beam emitted from the second light source to pass therethrough from the interior of the optical scanner toward a corresponding target surface outside the optical scanner, wherein the light deflector is attached to the first frame in a surrounding area defined by the first exposure opening, the second exposure opening, a line segment connecting one end of the first exposure opening and one end of the second exposure opening, and a line segment connecting the other end of the first exposure opening and the other end of the second exposure opening, wherein a second frame is provided opposite to the first frame on a side of the first frame where the light deflector is positioned, and wherein at least one connecting member configured to connect the first frame and the second frame is provided in the surrounding area.

2. The optical scanner according to claim 1, wherein the connecting member is integral with the second frame.

3. The optical scanner according to claim 1, wherein the connecting member is integral with the first frame.

4. The optical scanner according to claim 1, wherein the connecting member is a wall extending in the main scanning direction and having an opening through which a laser beam reflected from the light deflector is passed.

5. The optical scanner according to claim 4, wherein as viewed from a sub-scanning direction, the connecting member is fixed to the first frame or the second frame at a position overlapping with an effective scanning region, through which a laser beam reflected from the light deflector travels.

6. The optical scanner according to claim 4, wherein the connecting member is fixed to the first frame or the second frame at a plurality of positions, and wherein a distance between two outermost fixing positions at both sides in the main scanning direction is greater than half a length of the first exposure opening and the second exposure opening in the main scanning direction.

7. The optical scanner according to claim 6, wherein the plurality of fixing positions are asymmetrically arranged in an extension direction of the first exposure opening and the second exposure opening with respect to a center of the light deflector.

8. The optical scanner according to claim 7, wherein at least one of the plurality of fixing positions is located outside the surrounding area.

9. The optical scanner according to claim 1, wherein a third frame is provided opposite to the first frame such that the second frame is interposed between the first frame and the third frame, and the first frame and the third frame constitute a casing.

10. The optical scanner according to claim 1, wherein the connecting member is shaped as a column extending in a sub-scanning direction and positioned outside an effective scanning region, through which a laser beam reflected from the light deflector travels.

11. The optical scanner according to claim 10, wherein a plurality of connecting members are provided in the surrounding area.

12. The optical scanner according to claim 10, wherein the first frame and the second frame constitute a casing.

13. The optical scanner according to claim 10, wherein when cutting along a plane that is orthogonal to a direction in which the connecting member extends, the connecting member has a sectional area that is wider at the first frame side than at the second frame side.

14. The optical scanner according to claim 1, wherein at least one connecting member is provided closely to the first exposure opening and the second exposure opening, respectively, with respect to the light deflector, wherein a shortest distance between a fixing position of the connecting member close to the first exposure opening and the first exposure opening is less than half a shortest distance between the light deflector and the first exposure opening, and wherein a shortest distance between a fixing position of the connecting member close to the second exposure opening and the second exposure opening is less than half a shortest distance between the light deflector and the second exposure opening.

15. The optical scanner according to claim 1, further comprising third and fourth light sources each configured to emit a laser beam, wherein the first frame has a third exposure opening extending in the main scanning direction and configured to allow the laser beam emitted from the third light source to pass therethrough from the interior of the optical scanner toward a corresponding target surface outside the optical scanner, and a fourth exposure opening extending in the main scanning direction and configured to allow the laser beam emitted from the fourth light source to pass therethrough from the interior of the optical scanner toward a corresponding target surface outside the optical scanner, and wherein the third exposure opening and the fourth exposure opening are arranged to interpose therebetween the first and second exposure openings.

16. The optical scanner according to claim 15, wherein the third exposure opening, the first exposure opening, the second exposure opening, and the fourth exposure opening are arranged in this order, and wherein the connecting member is provided for connecting the first frame and the second frame in at least one of an area between the first exposure opening and the third exposure opening and an area between the second exposure opening and the fourth exposure opening.

* * * * *